US010800675B2

(12) United States Patent
Sattler et al.

(10) Patent No.: US 10,800,675 B2
(45) Date of Patent: Oct. 13, 2020

(54) METHOD FOR PREVENTING MARKS CAUSED BY DRYING AND A VEHICLE WASHING SYSTEM

(71) Applicant: WASHTEC HOLDING GMBH, Augsburg (DE)

(72) Inventors: Andreas Sattler, Munich (DE); Stefan Mayer, Neusäss (DE); Robert Auer, Stadtbergen (DE)

(73) Assignee: WASHTEC HOLDING GMBH, Augsburg (DE)

( * ) Notice: Subject to any disclaimer, the term of this patent is extended or adjusted under 35 U.S.C. 154(b) by 147 days.

(21) Appl. No.: 15/744,139

(22) PCT Filed: Jul. 15, 2016

(86) PCT No.: PCT/EP2016/066960
§ 371 (c)(1),
(2) Date: Jan. 12, 2018

(87) PCT Pub. No.: WO2017/013035
PCT Pub. Date: Jan. 26, 2017

(65) Prior Publication Data
US 2018/0201522 A1 Jul. 19, 2018

(30) Foreign Application Priority Data

Jul. 17, 2015 (DE) .................. 10 2015 111 622

(51) Int. Cl.
*B08B 3/02* (2006.01)
*B08B 3/08* (2006.01)
(Continued)

(52) U.S. Cl.
CPC .................. *C02F 1/42* (2013.01); *B08B 3/02* (2013.01); *B08B 3/08* (2013.01); *B08B 3/10* (2013.01);
(Continued)

(58) Field of Classification Search
CPC .. C02F 1/42; C02F 2001/422; C02F 2103/44; B08B 3/02; B08B 3/08; B08B 3/10; B60S 3/04
See application file for complete search history.

(56) References Cited

U.S. PATENT DOCUMENTS 2,801,941 A 8/1957 Johnson
5,647,977 A * 7/1997 Arnaud ..................... C02F 9/00
134/111

(Continued)

FOREIGN PATENT DOCUMENTS

DE 2522865 A1 12/1976
GB 1121751 7/1968
GB 2297901 A 8/1996

OTHER PUBLICATIONS

International Search Report dated Oct. 21, 2016 for PCT/EP2016/066960 filed Jul. 15, 2016.

(Continued)

*Primary Examiner* — Alexander Markoff
(74) *Attorney, Agent, or Firm* — Paul D. Bianco; Stephen Bongini; Fleit Intellectual Property Law

(57) ABSTRACT

A method for cleaning vehicles by means of which the formation of marks caused by drying is prevented. The method comprises a rinsing step using water. In the method, the anions forming poorly soluble salts with alkaline earth metals dissolved in water are removed from the water, while cations causing the water hardness are retained. Furthermore, a vehicle washing system includes: at least one application device for applying rinsing fluid to a vehicle to be cleaned; and an ion-exchange device for removing anions from the rinsing fluid prior to the application to the vehicle.

20 Claims, 2 Drawing Sheets

(51) Int. Cl.
  *B08B 3/10* (2006.01)
  *C02F 1/42* (2006.01)
  *B60S 3/04* (2006.01)
  *C02F 103/44* (2006.01)

(52) U.S. Cl.
  CPC ........... *B60S 3/04* (2013.01); *C02F 2001/422* (2013.01); *C02F 2103/44* (2013.01)

(56) References Cited

U.S. PATENT DOCUMENTS

| | | | |
|---|---|---|---|
| 6,042,730 | A | 3/2000 | Lahti |
| 6,562,142 | B2 * | 5/2003 | Barger .................... B08B 3/026 134/6 |
| 2002/0102359 | A1 * | 8/2002 | Rohrbaugh ............. B08B 3/026 427/388.4 |
| 2002/0108640 | A1 * | 8/2002 | Barger .................... B08B 3/026 134/26 |
| 2002/0144712 | A1 * | 10/2002 | Barger .................... B08B 3/026 134/6 |
| 2002/0160224 | A1 * | 10/2002 | Barger .................... B08B 3/026 428/689 |
| 2003/0034051 | A1 * | 2/2003 | Barger .................... B08B 3/026 134/10 |
| 2003/0230522 | A1 * | 12/2003 | Pavel .................... B01D 61/022 210/137 |
| 2004/0251207 | A1 * | 12/2004 | Carlberg .................. B01J 49/09 210/670 |
| 2008/0116136 | A1 * | 5/2008 | Wilkins .................... C02F 1/76 210/650 |
| 2010/0263689 | A1 * | 10/2010 | Monsrud .................. C02F 1/42 134/18 |
| 2014/0251824 | A1 * | 9/2014 | Astle ...................... B01D 61/48 205/749 |
| 2015/0047675 | A1 * | 2/2015 | Simonette ................ B08B 1/02 134/18 |
| 2018/0222774 | A1 * | 8/2018 | Everson ................... B01J 39/19 |

OTHER PUBLICATIONS

Written Opinion for PCT/EP2016/066960 dated Jul. 15, 2016.
English translation of International Preliminary Report on Patentability for PCT/EP2016/066960 filed Jul. 15, 2016.

* cited by examiner

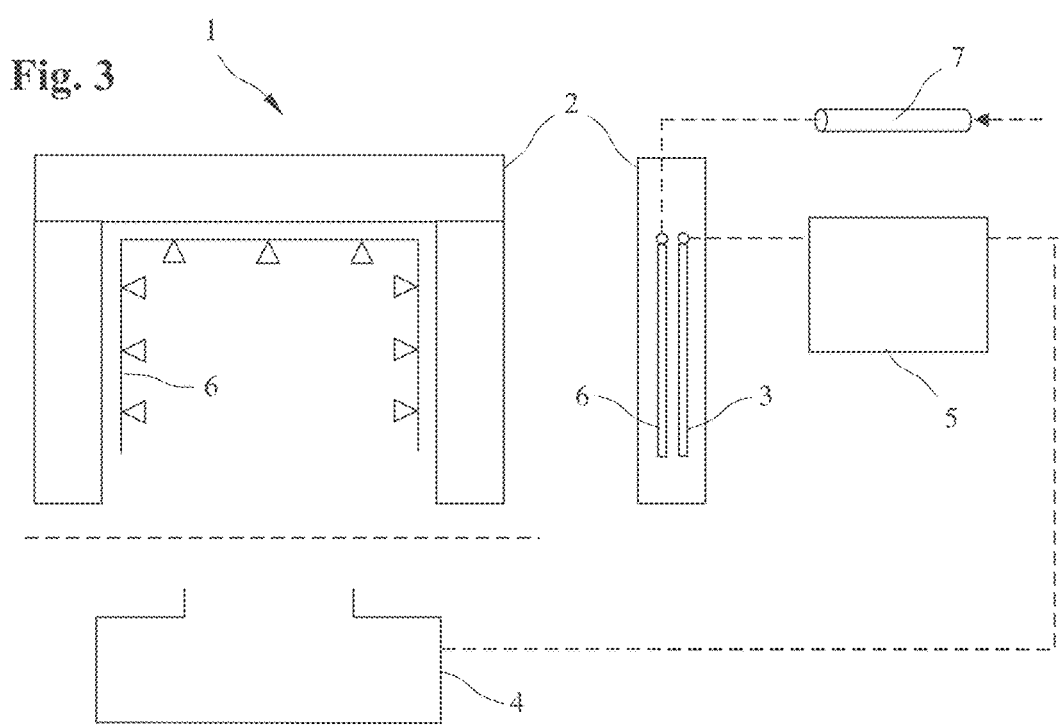
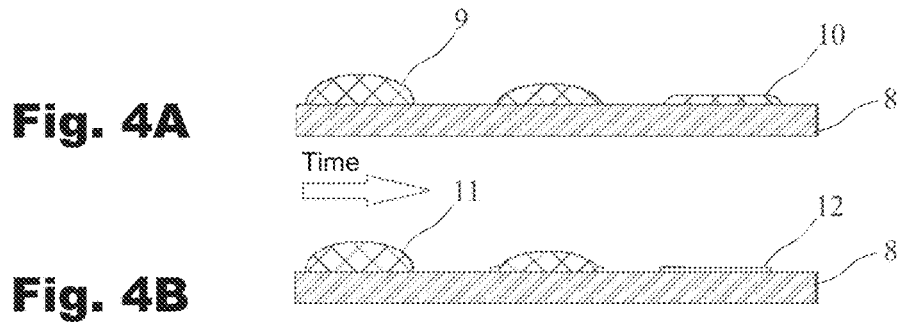
Fig. 4A
Fig. 4B
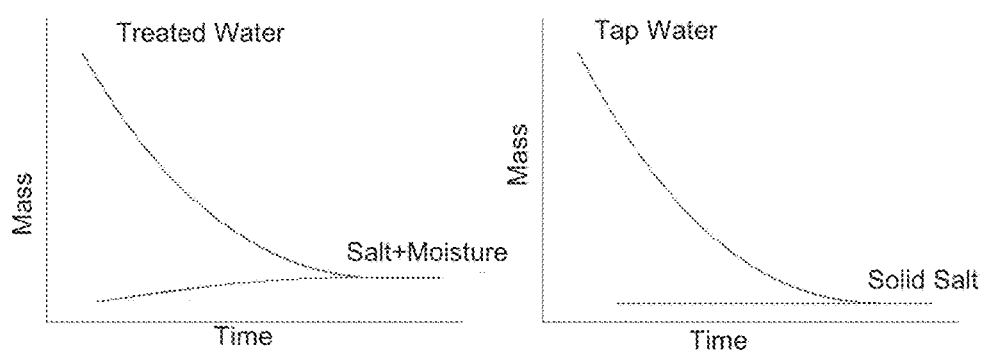
Fig. 5A
Fig. 5B

METHOD FOR PREVENTING MARKS CAUSED BY DRYING AND A VEHICLE WASHING SYSTEM

FIELD OF THE INVENTION

The present invention relates to a cleaning method for vehicles, especially passenger cars, especially a cleaning method that includes a rinsing step in which formation of visible spots, for example, on the body surface, is avoided. The invention also concerns a vehicle washing system.

BACKGROUND OF THE INVENTION

The rinsing of vehicles is conducted either with treated or untreated water or with a water-product mixture, especially with CDA addition (CDA—chemical drying aid, which hydrophobizes the surface) in order to convert drops (which tend to be small) or a closed water film into large drops, since these are easily blown from the vehicle by the blower unit.

Essentially two drying methods are common in the context of vehicle washing:

1) "Runoff drying," in which a water film as closed as possible is generated, which almost fully runs off automatically. The basis is the hydrophilization of the vehicle surface by surfactants or other wetting agents. This method is especially common in the washing of commercial vehicles.

2) "Blower drying," in which the closed water film is converted into the largest possible drops, which can then be removed from the vehicle by a blower. The basis is the hydrophobization of the vehicle surface by appropriate products, which are referred to as CDA, wax or similar agents.

The last-named method is especially common in car washing in portal systems or car washes and accounts for most of the market.

Relatively clean water, generally fresh water, is generally used to rinse the surface of an auto body. However, it has been found that, because of the calcium and magnesium salts contained in fresh water, the so-called water hardness, visible spots, which primarily originate from the insoluble carbonates or sulfates of group IIA elements, remain on the surface of the vehicle after drying. These insoluble carbonates or sulfonates are especially the carbonates of calcium and magnesium, as well as calcium sulfate. They are particularly poorly soluble in water and easily precipitate above the saturation point as a coating, for example, on the walls of water pipes. Such salts also form poorly soluble minerals in nature, for example, limestone (calcium carbonate), magnesite (magnesium carbonate) and/or gypsum (calcium sulfate). Owing to the limited solubility, whitish lime or gypsum spots or their equivalent poorly soluble magnesium salts remain on the body surface after use of water with water hardness as rinsing fluid at the end of the method for cleaning of vehicles, for example, after blower drying. These spots only appear after the residual water not removed by blower drying dries up. These spots are particularly conspicuous on high-gloss paint, especially in dark-colored paints or glass, and can be objected to as a quality defect by customers of a vehicle washing system. Such deposits also have a certain trapping effect for additional dirt, so that subsequent problems can be expected.

To solve this problem, it is proposed in the prior art to use desalinized or deionized water, which does not leave behind drying spots.

Systems in which the water is essentially softened with a cation exchanger and then treated with an osmosis device are also used.

Full desalinization of water can have drawbacks when combined with other steps of the complete cleaning method. Use of wetting agents is likewise not always advantageous, for example, for environmental reasons. The osmosis method yields fully desalinized water of high quality at relatively high cost, in which case the inclusion of a cation exchanger at the beginning is a requirement.

SUMMARY OF THE INVENTION

Embodiments of the present invention include a cleaning method in which the cleaning step occurs less expensively, more effectively and, at the same time, more flexibly relative to the prior art, and a better rinsing result is achieved, which prepares for a more advantageous blower drying of the surface.

It has now surprisingly been found that deliberate removal of anions that form poorly soluble salts with alkaline earth metals dissolved in water, like carbonate or sulfate, leads to a rinsing fluid that does not leave behind visible spots of salts that are poorly soluble in water (like gypsum or lime) on the surface of a cleaned vehicle after blower drying.

Disclosed are a method for the cleaning of vehicles and a vehicle washing system. Advantageous developments and refinements of the invention are also disclosed.

The method according to the invention includes a rinsing step with a rinsing fluid, especially water, the employed water having a water hardness, and wherein anions that form poorly soluble salts with alkaline earth metals dissolved in water are removed from the water, while the cations causing water hardness are retained. The anions forming poorly soluble salts with alkaline earth metals dissolved in water are of course removed before the rinsing step. Here, those salts with a solubility in water at 20° C. and 1013 mbar of not more than 10 g/L, particularly, not more than 1 g/L, are considered poorly soluble salts.

The anions forming poorly soluble salts with alkaline earth metals dissolved in water are expediently exchanged with anions that form readily soluble salts with alkaline earth ions, particularly with chloride ions. The anions forming poorly soluble salts with alkaline earth metals dissolved in water are generally chosen among carbonate, hydrogen carbonate and sulfate. Alkaline earth hydrogen carbonates are not poorly soluble per se, but are converted into poorly soluble carbonates under the influence of heat, as occurs, for example, during blower drying; hydrogen carbonates are therefore included among the anions that form poorly soluble salts with alkaline earth metal cations in the context of the present invention.

"Having a water hardness" means that the employed water contains alkaline earth metal cations, especially calcium and/or magnesium ions. The amount of alkaline earth metal cations depends on the local circumstances. The total amount of calcium and magnesium ions is generally at least 0.05 mmol/L, preferably at least 0.1 mmol/L, more preferably at least 1 mmol/L, and especially at least 1.3 mmol/L. The total amount of calcium and magnesium ions can amount to as much as 10 mmol/L; it is generally 1.3 to 6 mmol/L.

The cations causing water hardness are retained in the method according to the invention. This means that no steps are taken to remove the cations responsible for water hardness. Nevertheless, during removal of the anions, small losses of such cations can occur, for example, through adsorption effects. These losses generally amount to no more than 5 wt %, preferably not more than 2 wt %.

The anions responsible for water hardness that form poorly soluble salts with alkaline earth metals dissolved in water can then be removed with a strongly basic anion exchanger. The strongly basic anion exchanger is appropriately preloaded with anions that form readily soluble salts with alkaline earth ions, especially with chloride ions. Preloading generally occurs by activation of the commercial hydroxyl form of the anion exchanger with an aqueous alkali chloride solution, especially with a solution containing sodium chloride. The anions responsible for water hardness and forming poorly soluble salts with alkaline earth metals dissolved in water can also be at least 30% removed. If the anion exchanger is exhausted, it can preferably be regenerated with a solution containing sodium chloride. It is expedient to provide two or more ion exchange devices in parallel operation, in which case, one anion exchange device is in operation and the others regenerated or in a standby position. When one ion exchange device is exhausted, a switch to another device is made and the exhausted ion exchange device can be regenerated. Fresh water can be used as water in an advantageous embodiment.

The aforementioned vehicle washing system is characterized according to the invention by the fact that an ion exchange device is provided to remove anions from the rinsing fluid before application to the vehicle. The removed anions can preferably be exchanged with anions that form readily soluble salts with alkaline earth ions.

The ion exchange device can then be preferably set up to remove anions forming poorly soluble salts with the alkaline earth metals dissolved in the rinsing fluid from the rinsing fluid and to retain the cations responsible for water hardness of the rinsing fluid, especially to exchange the anions forming poorly soluble salts with alkaline earth metals dissolved in water with chloride ions. The rinsing fluid can advantageously contain or be water, especially fresh water. The rinsing fluid can also preferably contain a chemical drying aid.

In an advantageous embodiment, the application device can include a spray device to spray the rinsing fluid onto the vehicle. The spray device can be a spray arch with known spray nozzles but also a hand spray device, such as a cleaning lance.

The vehicle washing system can preferably include an additional application device to apply a treatment fluid to the vehicle, especially water mixed with detergents, care agents or polishing wax.

Preparation according to the invention can therefore occur in targeted fashion only for the rinsing fluid, so that use of the agent contained in the ion exchange device can be reduced.

In order to economize fresh water, the treatment fluid can contain service water treated by water treatment from already used treatment and/or rinsing fluid.

BRIEF DESCRIPTION OF THE DRAWINGS

The invention is described below by means of detailed embodiment examples with reference to the accompanying drawings. The drawings show:

FIG. 3 a schematic depiction of a portal washing system in which the method according to the invention is used;

FIGS. 4A and 4B a schematic depiction of a drying process over time with a) treated rinsing fluid (FIG. 4A) and b) untreated rinsing fluid (FIG. 4B);

FIGS. 5A and 5B mass-time diagrams for a drying process with a) treated rinsing fluid (FIG. 5A) and b) untreated rinsing fluid (FIG. 5B).

DETAILED DESCRIPTION OF THE INVENTION

Figure 1:
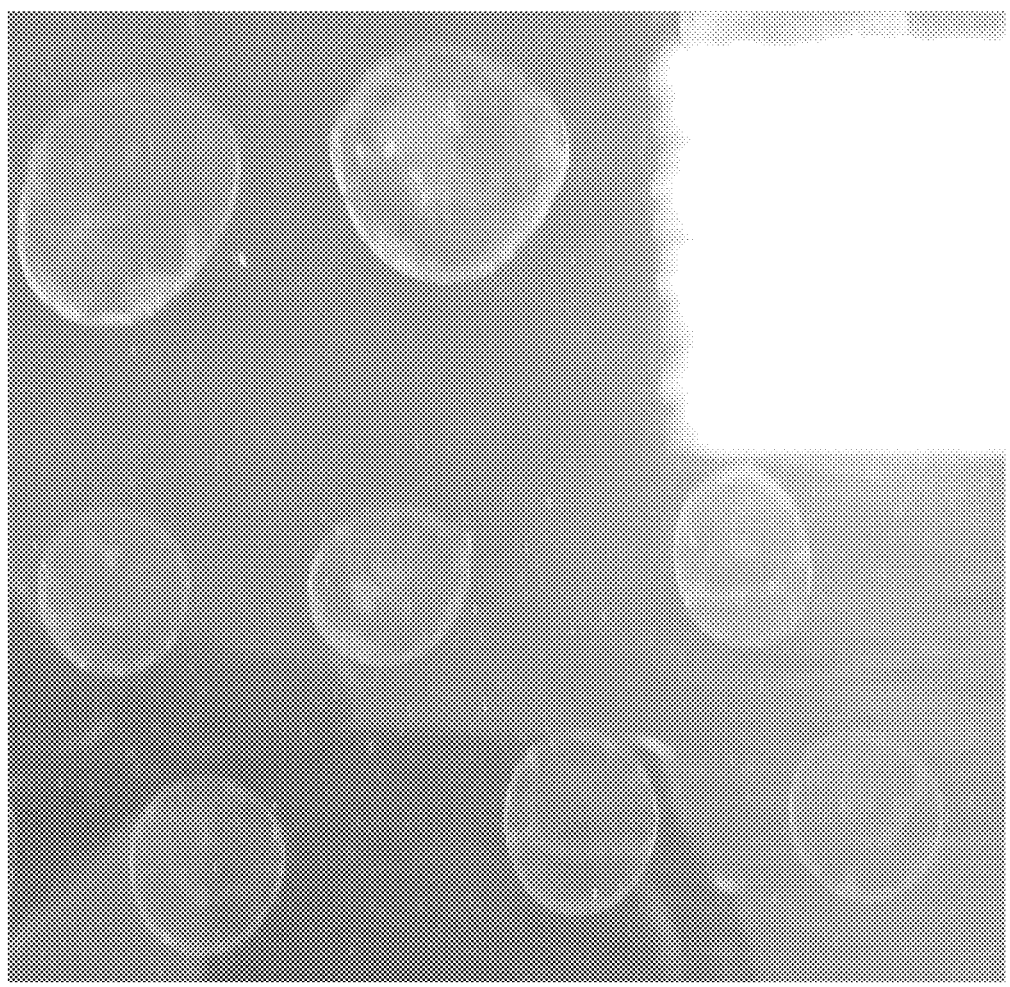
FIG. 1 a photographic depiction of lime spots.

The water used for rinsing in a vehicle cleaning method is generally so-called fresh water. Fresh water is generally of the quality of drinking water, but this is not necessary. Any qualitative equivalent surface water, for example, clear river water, rain water, etc., can also be used for the present purpose, as long as it can be prepared according to the invention. The objective of water treatment according to the invention is the reduction of poorly soluble ions in conjunction with cations of group IIA, especially magnesium and calcium. It has been shown that, when these anions are eliminated by at least 30%, preferably 50%, more preferably 60%, especially 70%, still more preferably 80%, ideally 90% and more, the result of rinsing after drying is particularly satisfactory, i.e., visible drying spots are no longer observed. The achieved extent depends on the corresponding water hardness and the capacity of an ion exchange device.

Depending on the location, drinking water can have different compositions. For example, calcium values in the range of about 70 to about 90 mg/L, magnesium values in the range of about 16 to about 25 mg/L, hydrogen carbonate values in the range of about 224 to about 380 mg/L, carbon dioxide values from about 6 to about 32 mg/L, and carbonate values from about 0.4 to about 0.7 mg/L are stated for Munich drinking water. These values can vary sharply, depending on the location in Germany.

The method according to the invention is generally applicable to all types of surfaces that must be cleaned and on whose surface spots of residual salts produced by water hardness are conspicuous. In this respect, the invention is particularly suited for dark, high-gloss painted sheet metal, as in vehicles. The method is especially suitable for vehicles that can pass through ordinary car washes or portal washing systems. This is especially true for cars of any size, sport cars, SUVs, vans, transport vehicles, mobile homes or campers.

The removal of anions can occur in different ways. There are, e.g., chemical methods or sorption methods, especially adsorption methods. Methods with basic anion exchangers, preferably strongly basic anion exchangers (SBA), are preferred. Anion exchanger types used for full desalinization in mixed beds can also be used here.

The following steps occur during removal of undesired anions $A^-$, if a strongly basic anion exchanger in chloride form is used.

Activation Step:

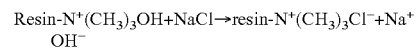

Exchange Step:

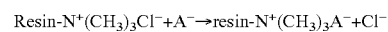

Regeneration Step:

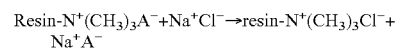

Carbon dioxide is predominantly dissolved in water as $HCO_3^-$ ($A^-=HCO_3^-$). Calcium hydrogen carbonate is soluble in water, but upon drying converts into the poorly soluble carbonate, which then forms the insoluble lime spot. Anions forming poorly soluble salts are also $SO_4^{2-}$ anions.

Any basic, especially strongly basic, anion exchanger resins are generally suitable as anion exchanger. The matrix of the resin can be arbitrary, an acryl or polystyrene base being preferred. Modification generally occurs via aliphatic quaternary side groups. The resin generally consists of spherical beads of the transparent gel type. The total capacity is usually 0.9 to 1.4 equivalent per L, for example, 1.3 equivalent per L (28.4 kg/ft$^3$) for the chloride form.

The method according to the invention can be used in any vehicle cleaning and/or washing systems. For example, FIG. 3 schematically depicts a known portal washing system 1 in a front view (left) and a corresponding side view (right).

The portal washing system 1 then has a washing portal 2 movable in the longitudinal direction with a first spray device 3 arranged thereon for application of cleaning liquid for cleaning of the vehicle.

For this purpose, the already-consumed washing liquid is collected in a sludge tank 4 beneath the washing zone and then re-treated with water treatment 5 as service water. The service water is then re-mixed with the cleaning agents, such as foam, shampoo, etc., and again supplied to the first spray device 3.

The washing portal 2 also has a second spray device 6 arranged thereon for application of water treated according to the invention for rinsing of the vehicle. For this purpose, fresh water is treated in an ion exchange device 7 according to the invention.

The vehicle is thus cleaned in one step within the overall process with treated service water, and the vehicle is rinsed clean of residual dirt in a subsequent step, in which the fresh water treated according to the invention is advantageously used in the last step. A chemical drying aid (CDA) can be applied with the fresh water treated according to the invention or preferably before. Such aids include, for example, organic and/or organosilicon amino/hydroxy-alkoxy compounds and/or alkoxy alcohols. It is then dried in a subsequent step with a blower (not shown).

It should be mentioned that a known CDA application with osmosis water in comparison with the method according to the invention described here is connected with a noticeable performance loss that does not occur in the water treated according to the invention.

A number of advantages are gained with respect to the method according to the invention relative to the known methods. It should initially be emphasized that an ion exchange device of the usual type, as is already often used in washing systems, can be employed, with the modification that an anion exchanger is now used instead of the cation exchanger. The invention can therefore be used in existing systems without significant modification.

The favorable effect of the invention is presumably due to the fact that, instead of leaving behind insoluble chalky lime or gypsum spots on the vehicle surface, the calcium or magnesium salts, depending on the extent of removal, are now present at most as water-soluble and hygroscopic deposits, for example, $CaCl_2$ or $MgCl_2$ on the surface of the vehicle. Such deposits also attract water so that the film of possible spots is no longer visible. FIG. 2 clearly shows the transparent appearance of the spots caused by the hygroscopic behavior of calcium and magnesium chlorides. Some of the insoluble salts can also become moist and therefore kept invisible by water. The spots can also completely subsequently disappear, for example, during rain. Lime or gypsum spots, on the other hand, remain and are visible in the dry state (cf. FIG. 1), which clearly shows deposited spots having a conspicuous white appearance.

This is again shown by means of the schematic depiction of a drying process over time in FIG. 4 and by mass-time diagrams in FIG. 5 with treated rinsing fluid (FIGS. 4a, 5a) and untreated rinsing fluid (FIGS. 4b, 5b).

FIG. 4a shows a drying process according to the invention from left to right with time. Residual water of the rinsing fluid with the water treated according to the invention, depicted by the drops 9, then remains on the vehicle surface 8 being cleaned after rinsing and usually even after intense blower drying. The water contained in drops 9 then evaporates, in which case, complete drying does not occur owing to the properties of the water treated according to the invention, but a "residual drop" 10 with residual moisture as described above remains. This is also apparent in FIG. 5a, where a certain fraction of moisture is retained.

Figure 2:
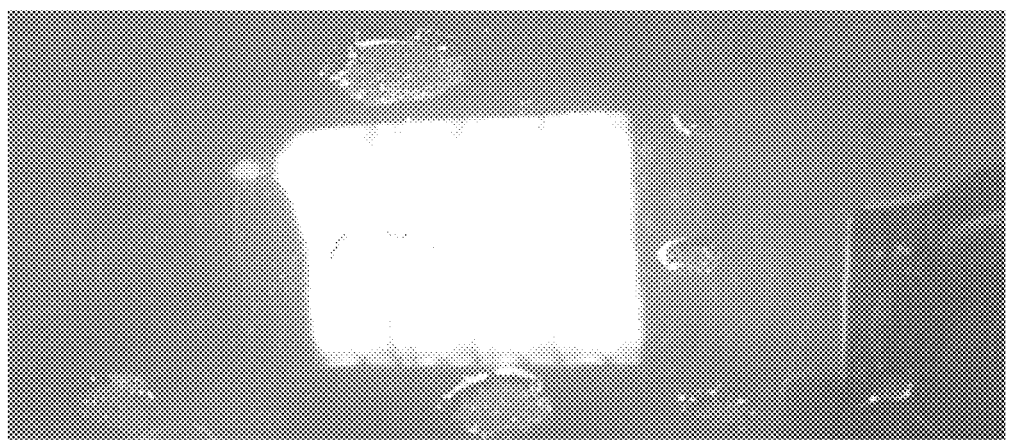
FIG. 2 a photographic depiction of "calcium chloride" spots.

In contrast thereto, it is apparent in FIG. 4b that the drops 11 of the rinsing fluid with untreated water remaining there after the rinsing process dry up completely with time and a distinctly recognizable drying spot 12 with sharply delimited edges therefore remains, as also shown in FIG. 1. It can also be deduced from FIG. 5b that the drop 11 completely dries up and only the readily visible drying spot 12 therefore remains on the vehicle surface 8.

Another advantage is that regeneration is only performed for the anion exchanger, i.e., regeneration chemicals are saved. In addition, regeneration of the anion exchanger with the physiologically and environmentally largely non-problematical sodium chloride is advantageous. No hazardous substances are present. Surfactants or other chemicals that burden the environment can also be dispensed with.

Relative to methods with an osmosis membrane desalinization, the method has the advantage that failure of the ion exchanger (for example, by failed regeneration) causes no damage to the system. An osmosis membrane is permanently damaged during failure of softening by blocking with lime, gypsum, etc. Such an event has no significant effect in the method according to the invention because functional capability can be rapidly restored by regeneration of the ion exchange device. The method according to the invention preferably includes neither a (reverse) osmosis step nor removal of salts by distillation.

The affinity of different ions to the ion exchange resin varies so that the quality of ion exchange depends on the number and type of ions dissolved in the water and is therefore location-dependent. In order to achieve the desired exchange efficiency even in the presence of many ions with low affinity, it might be necessary to over-dimension the exchanger. In this case, it should not be operated to its nominal capacity because the ions of lower affinity, for example, $HCO_3^-$ ions, which are to be removed as thoroughly as possible, then already break through.

The degree of removal of carbonate or sulfate ions can therefore be simply regulated by the ion exchange capacity and length of the ion exchange device. Monitoring of consumption of the ion exchange device can occur via the volumetric flow rate, with knowledge of the actual water hardness. An empirical scale that correlates degree of hardness with the parameters of the employed ion exchanger can be used in order to determine the safe time for regeneration of the ion exchange device.

The effect of the method according to the invention can also be advantageously checked by a test. The actual rinsing water is then dripped onto high gloss-painted sheet metal and allowed to dry in an air stream. If the ion exchanger is functional, white or bright spots are not apparent to the naked eye at a distance of 1 m. Otherwise the ion exchanger is used up and must be regenerated. The pH value or another chemical or physical parameter can also optionally be checked.

Ordinary line pressure can be used in setting up the method. The increased pressure necessarily required in an osmosis device in front of the osmosis membrane is not necessary. The ion exchange device and the spray device can, in principle, be exposed to the same pressure.

The volumetric flow rate of the ion exchange device is sufficient for all common applications. Intermediate storage of the treated rinsing fluid is not necessary. The volumetric flow rate is set so that the prescribed cleaning objective is achieved.

The rinsing step according to the invention can be integrated in an existing cleaning method for vehicles without a significant change of the essential parameters. Advantageous variants of cleaning methods can also be designed. For example, a chemical drying aid can be added to the rinsing water treated according to the invention. In usual methods, especially those using osmosis membranes, a separate step would be required for this purpose.

LIST OF REFERENCE NUMBERS

1 Portal washing system
2 Washing portal
3 First spray device (service water)
4 Sludge tank
5 Water treatment
6 Second spray device (fresh water)
7 Ion exchange device
8 Vehicle surface
9 Drops of rinsing fluid treated according to the invention
10 Residual drops of treated rinsing fluid
11 Drops of untreated rinsing fluid
12 Drying spots

The invention claimed is:

1. A method for cleaning of vehicles, said method comprising:
   removing from water, which has a water hardness, anions forming poorly soluble salts with alkaline earth metals dissolved in the water, while retaining in the water cations causing the water hardness, the anions forming poorly soluble salts with alkaline earth metals dissolved in the water being exchanged with anions that form readily soluble salts with alkaline earth ions; and
   after the removing from the water of the anions while retaining the cations, spraying a vehicle being cleaned with the water.

2. The method according to claim 1, wherein in the removing from the water of the anions while retaining the cations, the anions forming poorly soluble salts with alkaline earth metals dissolved in the water are exchanged with chloride ions.

3. The method according to claim 1, wherein the removing from the water of the anions while retaining the cations comprises using a strongly basic anion exchanger to remove the anions forming poorly soluble salts with alkaline earth metals dissolved in the water.

4. The method according to claim 3, further comprising preloading the strongly basic anion exchanger with the anions that form readily soluble salts with alkaline earth ions.

5. The method according to claim 4, further comprising preloading the strongly basic anion exchanger with chloride ions.

6. The method according to claim 1, wherein in the removing from the water of the anions while retaining the cations, the anions forming poorly soluble salts with alkaline earth metals dissolved in the water are at least 30% removed.

7. The method according to claim 3, further comprising regenerating the strongly basic anion exchanger with a solution containing sodium chloride.

8. The method according to claim 1, wherein the anions forming poorly soluble salts with alkaline earth metals dissolved in the water are chosen among carbonate, hydrogen carbonate, and sulfate.

9. The method according to claim 1, wherein the water from which the anions are removed is fresh water.

10. A vehicle washing system comprising:
    at least one application device to apply a rinsing fluid to a vehicle being cleaned; and
    an ion exchange device coupled to the at least one application device to remove anions from the rinsing fluid before the rinsing fluid is applied to the vehicle, the ion exchange device removing anions forming poorly soluble salts with alkaline earth metals dissolved in the rinsing fluid from the rinsing fluid while retaining in the rinsing fluid cations that cause water hardness of the rinsing fluid, the anions forming poorly soluble salts with alkaline earth metals dissolved in the rinsing fluid being exchanged with anions that form readily soluble salts with alkaline earth ions.

11. The vehicle washing system according to claim 10, wherein the that form readily soluble salts with alkaline earth ions comprise chloride ions.

12. The vehicle washing system according to claim 10, wherein the rinsing fluid comprises fresh water.

13. The vehicle washing system according to claim 10, wherein the rinsing fluid comprises a chemical drying aid.

14. The vehicle washing system according to claim 10, wherein the application device includes a spray device to spray the rinsing fluid onto the vehicle.

15. The vehicle washing system according to claim 10, further comprising an additional application device to apply a treatment fluid to the vehicle.

16. The vehicle washing system according to claim 15, wherein the treatment fluid applied to the vehicle comprises service water treated by water treatment from already consumed treatment fluid and/or rinsing fluid.

17. The method according to claim 1, wherein in the removing from the water of the anions while retaining the cations, the anions forming poorly soluble salts with alkaline earth metals dissolved in the water are exchanged with anions that form readily soluble and hygroscopic salts with alkaline earth ions.

18. The method according to claim 1, wherein in the removing from the water of the anions while retaining the cations, the anions forming poorly soluble salts with alkaline earth metals dissolved in the water are exchanged with anions other than OH−.

19. The method according to claim 1, further comprising:
    before spraying the vehicle with the water, spraying the vehicle with a treatment fluid.

20. The vehicle washing system according to claim 10, wherein the rinsing fluid comprises water.

* * * * *